United States Patent [19]

Kawabata et al.

[11] Patent Number: 5,748,257
[45] Date of Patent: May 5, 1998

[54] PICTURE INFORMATION DETECTING APPARATUS FOR A VIDEO SIGNAL

[75] Inventors: Minoru Kawabata, Sakai; Atsuhisa Kageyama, Ibaraki, both of Japan

[73] Assignee: Matsushita Electric Industrial Co., Ltd., Osaka, Japan

[21] Appl. No.: 852,670

[22] Filed: May 7, 1997

Related U.S. Application Data

[63] Continuation of Ser. No. 418,014, Apr. 6, 1995, abandoned.

[30] Foreign Application Priority Data

Apr. 15, 1994 [JP] Japan ..................... 6-077091

[51] Int. Cl.$^6$ ................. H04N 5/20; H04N 5/46
[52] U.S. Cl. ................. 348/615; 348/28; 348/556; 348/696
[58] Field of Search ............... 348/28, 445, 449, 348/516, 558, 615, 704, 672, 673, 689, 696, 379, 380, 687, 688, 649, 650; H04N 5/20, 5/21, 5/46

[56] References Cited

U.S. PATENT DOCUMENTS

| | | | |
|---|---|---|---|
| 4,665,437 | 5/1987 | Nicholson | 348/449 |
| 4,811,101 | 3/1989 | Yagi | 358/171 |
| 4,823,184 | 4/1989 | Belmares-Sarabia et al. | 348/650 |
| 5,087,976 | 2/1992 | Oda et al. | 348/28 |
| 5,146,331 | 9/1992 | Tsuchida | 348/556 |
| 5,168,362 | 12/1992 | Yoshida | 348/696 |
| 5,354,369 | 10/1994 | Izawa et al. | 348/672 |
| 5,355,225 | 10/1994 | Bachmann et al. | 348/649 |
| 5,432,550 | 7/1995 | Kwon | 348/28 |

FOREIGN PATENT DOCUMENTS

| | | | |
|---|---|---|---|
| 460595 | 12/1991 | European Pat. Off. | H04N 9/72 |
| 467602 | 1/1992 | European Pat. Off. | H04N 9/77 |
| 520339 | 12/1992 | European Pat. Off. | H04N 5/44 |
| 633690 | 1/1995 | European Pat. Off. | H04N 5/16 |
| 3-72796 | 3/1991 | Japan | H04N 7/13 |
| 3113970 | 5/1991 | Japan | H04N 5/46 |
| 3-262285 | 11/1991 | Japan | H04N 5/46 |
| 4-192777 | 7/1992 | Japan | H04N 7/01 |
| 5030386 | 2/1993 | Japan | H04N 5/16 |
| 5300448 | 11/1993 | Japan | H04N 5/46 |
| 6125481 | 5/1994 | Japan | H04N 5/16 |
| 6125482 | 5/1994 | Japan | H04N 5/16 |
| 6189221 | 7/1994 | Japan | H04N 5/46 |

OTHER PUBLICATIONS

European Search Report dated 24 May 1995.

*Primary Examiner*—John K. Peng
*Assistant Examiner*—Jeffrey S. Murrell
*Attorney, Agent, or Firm*—Ratner & Prestia

[57] ABSTRACT

A picture information detecting apparatus includes a picture area signal output circuit to detect a picture area excluding black band portions from the input video signal to produce a picture area signal to designate the picture area from which picture information is detected. Also included is a picture information detecting circuit for detecting picture information from the input video signal in the designated area. A picture quality compensating circuit is also provided for compensating the video input signal using the detected picture information to produce the gradation compensated video signal. An EDTV 2 discriminating circuit may also be included to determine if the video input signal is an EDTV 2 signal.

8 Claims, 4 Drawing Sheets

PICTURE INFORMATION DETECTING APPARATUS FOR A VIDEO SIGNAL

This application is a continuation-in-part of application Ser. No. 08/418,014 filed Apr. 6, 1995, now abandoned.

BACKGROUND OF THE INVENTION

(1) Field of the Invention

The present invention relates to a picture information detecting apparatus for a video signal to improve television picture quality.

(2) Description of the Prior Art

Recently, color television receiver screens have increased in size. As a result, different picture quality compensating apparatuses have become important in preventing picture suppression and black level buoying, and to improve picture gradation and picture quality.

FIG. 1 shows an input-output characteristic of a black level compensating circuit for improving picture quality for a video signal in accordance with the prior art. The input signal is a luminance signal. The abscissa is an input signal level of the black level compensating circuit and the ordinate is an output signal level. Point A is a minimum brightness level of the input signal, curve B is an input-output characteristic without compensation and curve C is an input-output characteristic with compensation.

If black level compensation is not applied as indicated by curve B, a picture having a brightness level below the minimum brightness level of point A can result. Accordingly, the black level in the picture is buoyant. To improve picture gradation, the minimum brightness level of the output signal is lowered near the pedestal level, point A, where level drift due to black level compensation does not occur. This is accomplished in FIG. 1 by increasing the slope of characteristic curve B to cause the minimum brightness level to approach the pedestal level.

Thus black level buoying can be prevented and gradation of the black part can be improved by processing the luminance signal at the black level compensating circuit. The compensating circuit is controlled so the compensation effect increases as the average picture level increases.

In the above-described circuit, however, a malfunction sometimes occurs when the video signal has an aspect ratio (width to height) where the essential picture area is larger than that of the screen. The signal level except for the essential picture area is at a black level. For example, when a high definition television signal is displayed on a screen with an 4:3 aspect ratio, horizontal black bands on the upper and lower portions of the screen appear as shown in FIG. 2. Alternately, for example, when a video signal having a 4:3 aspect ratio of essential picture area is displayed on a screen having a 16:9 aspect ratio, vertical black bands appear on the left and right portions of the screen as shown in FIG. 3.

The malfunction is caused by the picture information detection. For example, the minimum brightness level for black level compensation and the average picture level (APL) should be detected in the picture area as indicated by P in FIGS. 2 and 3. The minimum brightness level, however, is also detected in the upper and lower or the right and left black bands outside of the picture area P.

For example, the minimum brightness detecting circuit sometimes does not detect the minimum brightness level of the video signal but detects the brightness level in the black bands or the APL detecting voltage sometimes appears to be a lower voltage than the essential detecting voltage. Thus, the compensation circuit does not function normally because of the malfunction in the detecting circuit.

SUMMARY OF THE INVENTION

The present invention relates to a picture information detecting apparatus for a video signal which can detect the picture information in the video signal even if the video signal is displayed on a screen with a different aspect ratio.

The picture information detecting apparatus includes a picture area signal output circuit, a second generation extended definition television system (referred to as EDTV 2, hereafter), a discriminating circuit, a picture information detecting circuit, and a picture quality compensating circuit.

The picture area signal output circuit provides a picture area signal from the essential picture area excluding the black band portions surrounding the essential picture in the video input signal. These bands appear, for example, in the upper and lower or right and left sides on the screen. The picture quality compensation information such as the minimum brightness level is detected in the picture area signal and from the video input signal at the picture information detecting circuit. The video input signal is compensated at the picture quality compensating circuit using the detected picture quality compensation information to obtain an optimum picture quality to produce a gradation compensated video signal.

Alternatively, if the video input signal includes an EDTV 2 discriminating signal which is detected at the EDTV 2 discriminating circuit, a picture area signal having an 16:9 aspect ratio is provided from the picture area signal output circuit. The picture information is detected in a designated area from the video input signal at the picture information detecting circuit. The video input signal is compensated using the picture information to produce a gradation compensated video signal.

Accordingly, the picture information detecting apparatus can detect from a video signal normal picture information even if the video signal has a different aspect ratio than the screen.

DETAILED DESCRIPTION OF THE INVENTION

First Exemplary Embodiment

Figure 1:
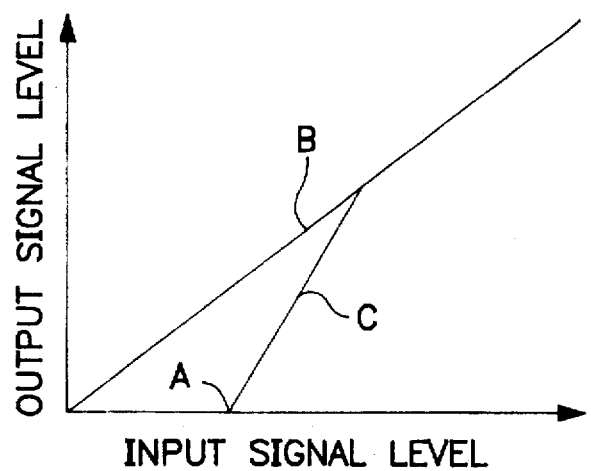
FIG. 1 illustrates an input-output characteristic of a black level compensating circuit having a picture quality compensating apparatus for a video signal in accordance with the prior art.
Figure 2:
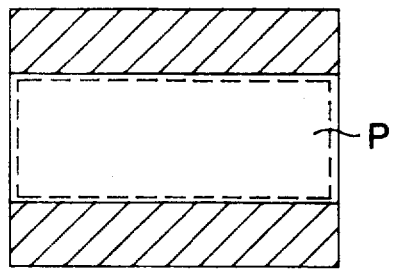
FIG. 2 illustrates a horizontally long picture displayed on a screen with a 4:3 aspect ratio.
Figure 3:
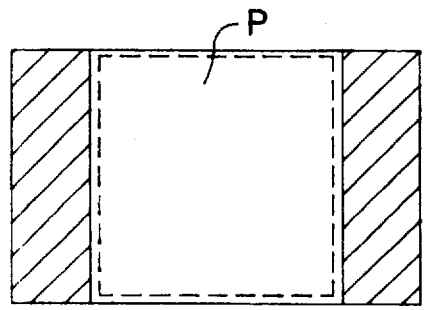
FIG. 3 illustrates a picture with a 4:3 aspect ratio displayed on a screen having a 16:9 aspect ratio.
Figure 4:
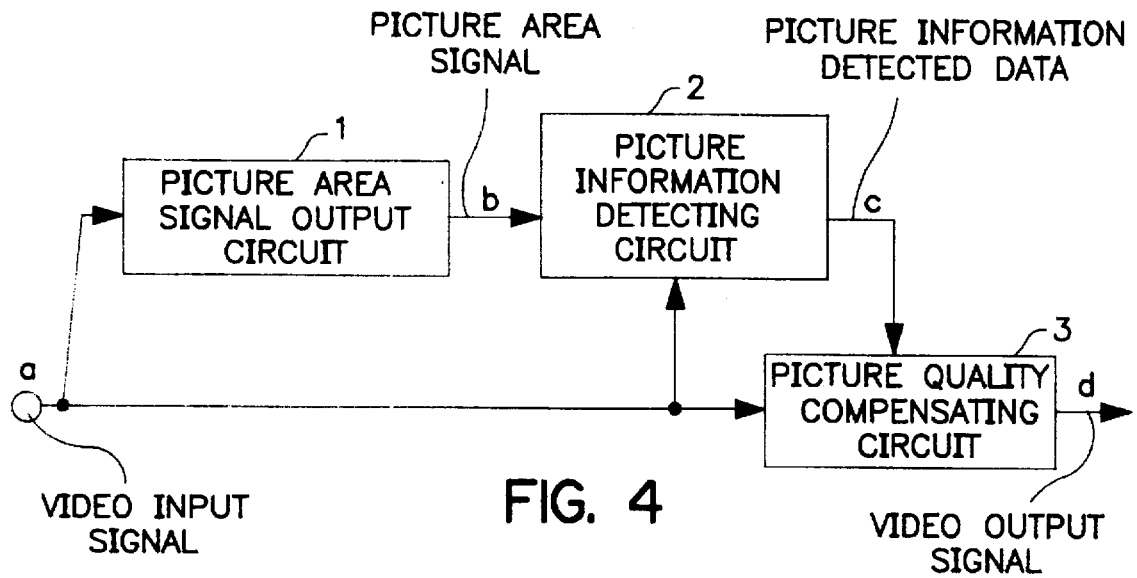
FIG. 4 is a block diagram of a picture information detecting apparatus in accordance with a first exemplary embodiment of the present invention.

FIG. 4 is a block diagram of a picture information detecting apparatus for a video signal in accordance with a first exemplary embodiment of the present invention.

An area is designated so that picture information necessary for compensating picture quality can be detected. Horizontal and vertical positions which can be detected over the entire screen are designated in the picture area signal output circuit 1. Based on the designated positions, a picture area signal b is produced determining a detection area for picture information detection. The picture information is detected in the detection area from the video input signal a at the picture information detecting circuit 2. The detected picture information data c is provided to the picture quality compensating circuit 3. The picture quality compensating circuit 3 compensates the video input signal a to an optimum picture quality using the picture information detected data c to produce video output signal d.

Thus, according to the first exemplary embodiment, a picture information detecting apparatus for a video signal can be realized which can detect an optimum picture information by detecting picture information using detected data in the designated area provided from the picture information detecting circuit and by compensating the video input signal at the picture quality compensating circuit.

Second Exemplary Embodiment

Figure 5:
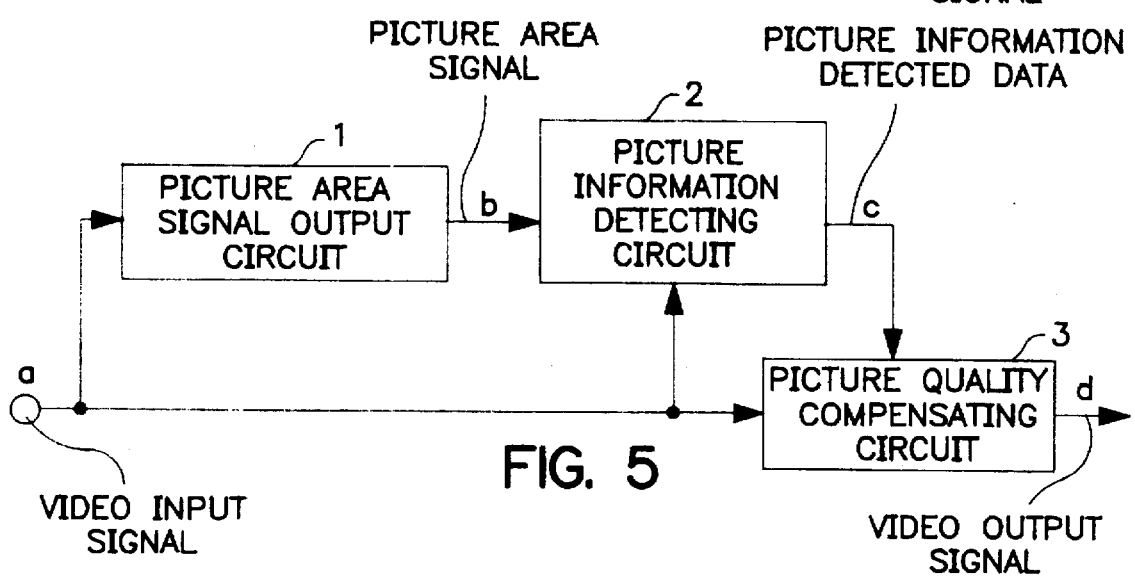
FIG. 5 is a block diagram of a picture information detecting apparatus in accordance with a second exemplary embodiment of the present invention.

FIG. 5 is a block diagram of a picture information detecting apparatus in accordance with a second exemplary embodiment of the present invention.

Figure 9:
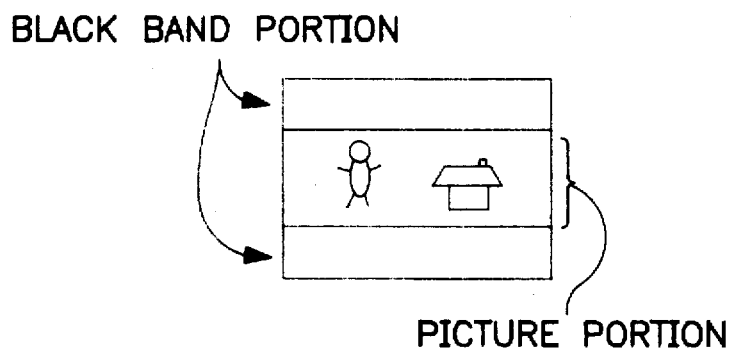
FIG. 9 illustrates a picture having a picture portion and two black bands located at the top and bottom of a screen.
Figure 10:
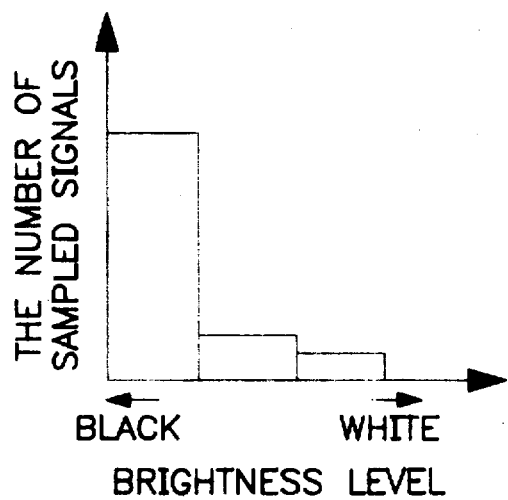
FIG. 10 is a histogram of the black band portion of the picture shown in FIG. 9.
Figure 11:
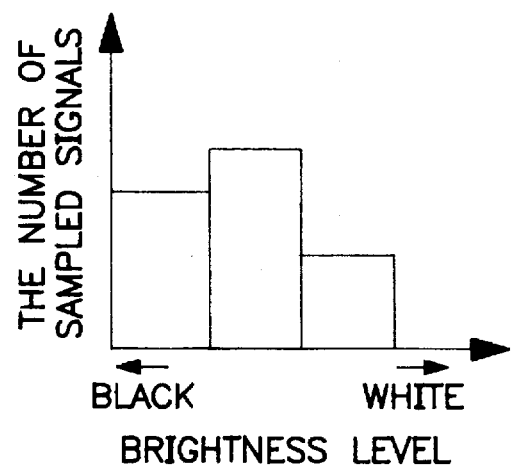
FIG. 11 is a histogram of the picture portion of the picture shown in FIG. 9.

A picture area signal output circuit 1 detects a picture area excluding black band portions from a video input signal a and provides a picture area signal b to picture information detecting circuit 2. For example, a luminance signal component of the input video signal is sampled every scanning line and the number of sampled signals for the ranges of designated brightness levels of the luminance signal is calculated. FIG. 9 illustrates a picture having two black bands at the top and the bottom of a picture. The number of samples signals against the brightness level can be expressed by a histogram. FIG. 10 is a histogram of the black band portions of the picture shown in FIG. 9. Most of the sampled signals are grouped in the black level range as shown in FIG. 10. FIG. 11 is a histogram of the picture portion of the picture shown in FIG. 9. Using the histograms, it can be determined if the signal is on the black band portion or on the picture portion for each scanning line. The boundary lines of the picture at the upper and lower black bands are judged by detecting an edge where the signal changes from black to some brightness level at the upper black band and from some brightness level to black at the lower black band.

The picture information detecting circuit 2 detects picture information from the video input signal a in the area designated by the picture area signal b and provides picture information detected data c to the picture quality compensating circuit 3. The picture quality compensating circuit 3 compensates the video input signal a to an improved picture quality using the picture information detected data c to produce video output signal d.

Figure 6:
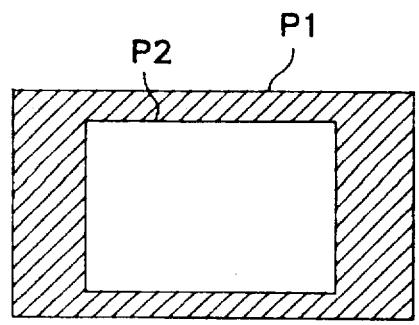
FIG. 6 illustrates a video signal displayed on a screen with a different aspect ratio.

FIG. 6 illustrates a picture having an aspect ratio different from the aspect ratio of the screen where it is displayed.

When a video signal with the same aspect ratio as that of the screen is provided to the screen, the width and the height of the picture coincide with those of the screen and the entire screen area is filled with the picture. In this case, picture information from the video input signal is detected from the entire screen area. When a video signal with a different aspect ratio from the screen is displayed, the actual picture P2 can be smaller than the screen area P1. There is no picture outside area P2 which is the hatched shown in FIG. 6. The video signal level coincides with the pedestal level.

If picture information is detected in the area P1 outside P2, the whole hatched area is judged, detected, as black. For example, consider the case where the minimum brightness level is detected from the video input signal and the brightness level of the hatched area is lower than the minimum brightness level of the picture in picture area P2 shown in FIG. 6. In this case the brightness level of the hatched area is sometimes detected as a minimum brightness level of the picture or the brightness level of the hatched area is detected and used to determine the average picture level of the video input signal. As a result, the detected APL appears lower than the correct APL in picture area P2.

The brightness level of the video input signal a is determined as described below. First, it is determined if there is a continuous black area above, below, right, or left of the picture, corresponding to the hatched area shown in FIG. 6. Then horizontal and vertical positions of the actual picture area P2 excluding the hatched area are detected by the picture area signal output circuit 1.

Whenever the picture area P2 varies, the detected horizontal and vertical positions are limited to the picture area in the video input signal. The detected signal is provided as a picture area signal b from the picture area signal output circuit 1.

The picture information detection is executed during the period of the picture area signal b at the picture information detecting circuit 2. The picture information detection is only executed for the picture area P2. If the picture information detection is executed for data outside the picture area P2, noise may be incorrectly detected and treated as part of the picture information. The detected data is provided as picture information detected data c and the video input signal a is compensated to an optimum picture quality based on the detected data c at the picture quality compensating circuit 3 to produce compensated video signal d.

Thus, according to the second exemplary embodiment, a picture information detecting apparatus for a video signal is realized which can detect picture information even when a video signal with a different aspect ratio from that of the screen is provided. Detecting picture information is obtained from a picture area signal as determined by the picture area signal output circuit. The video input signal is then compensated at the picture quality compensating circuit.

Third Exemplary Embodiment

Figure 7:
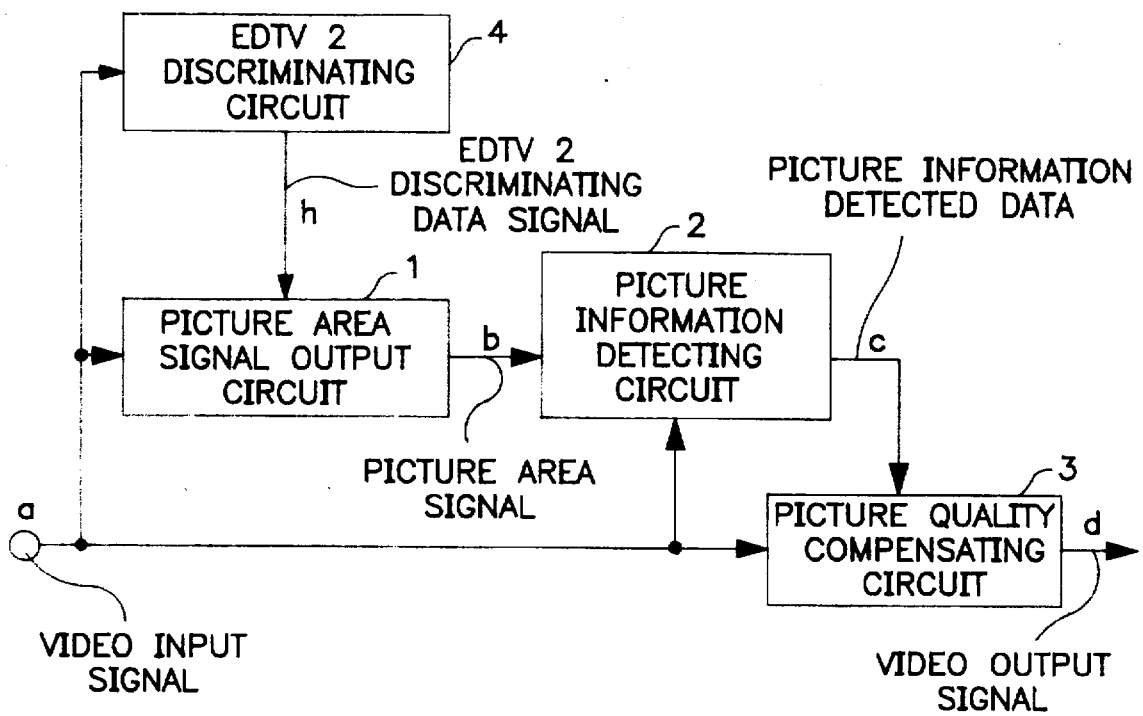
FIG. 7 is a block diagram of a picture information detecting apparatus in accordance with a third exemplary embodiment of the present invention.
Figure 8:
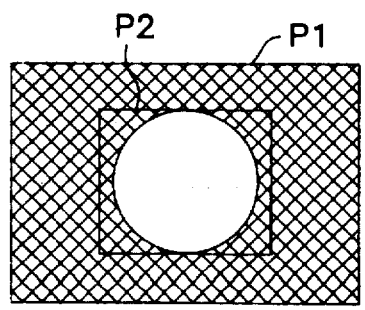
FIG. 8 illustrates a scene of a night sky including a moon picture area detection.

FIG. 7 is a block diagram of a picture information detecting apparatus for a video signal in accordance with a third exemplary embodiment of the present invention. FIG. 8 is an illustration of a scene which can cause a malfunction in the picture area detection.

An EDTV 2 discriminating circuit 4 determines if the video input signal is an EDTV 2 signal or not, and produces an EDTV 2 discriminating signal h representing its determination. A picture area signal output circuit 1 fixes an aspect ratio of the picture area from which picture information is detected to 16:9, if the video input signal is judged to be an EDTV 2 signal by the EDTV discriminating signal h and produces a picture area signal b. A picture information detecting circuit 2 detects picture information from the video input signal a in the area designated by the picture area signal b and provides picture information detected data c. A picture quality compensating circuit 3 compensates the video input signal a to an optimum picture quality using the picture information detected data c and provides a video output signal d.

As in the first and second exemplary embodiments, the picture area signal output circuit 1 provides a picture area signal b. The picture area detection, however, can malfunction for some pictures and, as a result, the picture area signal output circuit 1 can provide an area signal with a different picture area from the actual picture area.

When the aspect ratio of the video input signal coincides with that of the screen, for example, a night sky with a moon, there is no area corresponding to the hatched area shown in FIG. 6. There is, however, as shown in FIG. 8, a cross-hatched area around the moon that can be misjudged as the hatched area in FIG. 6. Therefore, the picture area signal output circuit 1 sometimes provides a false picture area signal. When the aspect ratio of the video input signal is previously known, this malfunction can be prevented by making the picture area signal b have the same aspect ratio as that of the video input signal.

In various television signal standards, an EDTV 2 signal is provided indicating the aspect ratio of the essential picture information area and the signal level of the area excluding the picture area at a black level. The aspect ratio of the EDTV 2 signal is determined to be 16:9 and an EDTV 2 discrimination control signal is inserted at the 22nd and 285th horizontal scanning periods in the EDTV 2 signal.

An EDTV 2 discriminating data signal can be detected when decoding this control signal. It can be determined if this signal is an EDTV 2 signal or not using the EDTV 2 discriminating data signal.

The EDTV 2 discriminating circuit 4 shown in FIG. 7 (1) detects an EDTV 2 discriminating data signal h from the video input signal a, (2) determines if it is an EDTV 2 signal or not, and (3) produces an EDTV 2 discriminating data signal h.

If the video input signal is an EDTV 2 signal, the picture area signal output circuit 1 provides a picture area signal b having a fixed aspect ratio of 16:9 preventing a malfunction of the picture area detection because of a special scene. When a video signal which is not an EDTV 2 signal is provided to the picture area signal output circuit 1, the picture information detecting circuit 2 and the picture quality compensating circuit 3 function as the first and second exemplary embodiments.

Thus, according to the third exemplary embodiment, a picture information detecting apparatus is realized which prevents malfunction of the picture area detection and provides stable detection of picture information by providing a picture area signal with a 16:9 aspect ratio from the picture area signal output circuit for detecting picture information if the video input signal is determined to be an EDTV 2 signal at the EDTV 2 discriminating circuit. The video input signal is compensated at the picture quality compensating circuit to produce a compensated video signal.

The input signal can be a luminance signal, a chrominance signal, a color difference signal, or a primary color signal instead of a video signal in the first, second, and third exemplary embodiments. Similarly, any method to detect picture information such as white peak detection or histogram detection can be used for the picture information detection instead of the minimum brightness level detection or APL detection.

According to the present invention, a picture information detecting apparatus for a video signal which can detect picture information for a video input signal with a different aspect ratio from that of the screen can be realized using a picture area signal output circuit, a picture information detecting circuit, an EDTV 2 discriminating circuit, and a picture quality compensating circuit.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A picture information detecting apparatus for an input video signal comprising:

means for locating a portion of the input video signal corresponding to an area, which is bordered by at least one band having a width said input video signal having an aspect ratio and a corresponding picture quality, from which the picture information is obtained;

means for detecting, independent of said aspect ratio of said input video signal, the picture information from the located area; and means for adjusting a corresponding picture quality of the input video signal in the located area using the detected picture information.

2. A picture information detecting apparatus according to claim 1, wherein said means for locating said portion of said input video signal identifies the area as the area.

3. A picture information detecting apparatus according to claim 1, wherein said means for detecting automatically detects the picture information from the located area.

4. A picture information detecting apparatus for an input video signal comprising:

a screen having a screen aspect ratio, said screen displaying a picture corresponding to the input video signal, said picture having a picture quality and said input video signal having an input video signal aspect ratio;

means for detecting horizontal position data and vertical position data from the input video signal to locate a portion of the input video signal corresponding to an area of the input signal bordered by at least one band having a width from which picture information is to be detected;

means for detecting the picture information from the input video signal in the area if the screen aspect ratio is different from the input video signal aspect ratio; and means for adjusting the input video signal to change the picture quality using the detected picture information.

5. The picture information detecting apparatus of claim 4, wherein the means for detecting identifies the area of the input video signal based on a luminance signal component in the input video signal.

6. A picture information detecting apparatus according to claim 4, wherein said means for detecting horizontal and vertical position data automatically locates the picture information from the located area.

7. A picture information detecting apparatus according to claim 4, wherein said means for detecting the picture information automatically detects the picture information from the located area.

8. A picture information detecting apparatus for an input video signal comprising:

means for (1) determining if the input video signal is a video signal having a second generation extended definition television standard signal having a specified aspect ratio and (2) producing a discriminating signal;

means, in response to the discriminating signal, for designating a picture area and providing a picture area signal fixing horizontal positions and vertical positions of the input video signal if the input video signal has the second generation extended definition television signal;

means for detecting picture information from the input video signal in the picture area; and means for adjusting the input video signal to change the picture quality using the detected picture information.

* * * * *